US009546874B2

United States Patent
Compton et al.

(10) Patent No.: US 9,546,874 B2
(45) Date of Patent: Jan. 17, 2017

(54) OPTIMAL ROUTE SOLUTION

(75) Inventors: David Compton, Lenexa, KS (US);
James Eaton, Gardner, KS (US);
Justin Nelson, Merriam, KS (US);
David Pierre, Leawood, KS (US);
Matthew Sawka, Smithville, MO (US)

(73) Assignee: CERNER INNOVATION, INC., Overland Park, KS (US)

( * ) Notice: Subject to any disclaimer, the term of this patent is extended or adjusted under 35 U.S.C. 154(b) by 1089 days.

(21) Appl. No.: 12/980,492

(22) Filed: Dec. 29, 2010

(65) Prior Publication Data
US 2012/0173137 A1 Jul. 5, 2012

(51) Int. Cl.
*G01C 21/20* (2006.01)
(52) U.S. Cl.
CPC .................. *G01C 21/206* (2013.01)
(58) Field of Classification Search
CPC ....................................................... G01C 21/206
USPC ......................................... 701/433, 434, 435
See application file for complete search history.

(56) References Cited

U.S. PATENT DOCUMENTS

| 7,248,933 B2 | 7/2007 | Wildman |
| 7,443,303 B2 | 10/2008 | Spear et al. |
| 7,796,045 B2 | 9/2010 | Spear et al. |
| 8,140,258 B1 * | 3/2012 | Dempsey ...................... 701/467 |
| 8,437,954 B1 * | 5/2013 | Freeman .............. G01C 21/343 701/426 |
| 2006/0247849 A1 * | 11/2006 | Mohsini et al. .............. 701/206 |
| 2007/0219711 A1 * | 9/2007 | Kaldewey et al. ........... 701/208 |
| 2009/0037100 A1 * | 2/2009 | Fujiwara et al. ............. 701/209 |

* cited by examiner

*Primary Examiner* — Basil T Jos
(74) *Attorney, Agent, or Firm* — Shook, Hardy & Bacon L.L.P.

(57) ABSTRACT

Methods, systems, and computer storage media are provided for identifying an optimal route to a destination for a user. The optimal route is customized for the user based on one or more route factors. The route factors may include a physical limitation of the user or a restricted area of a healthcare environment. The route factors may also include obstacles within the route or user preferences. An optimal route is identified as such when no route factors conflict with the optimal route.

20 Claims, 8 Drawing Sheets

OPTIMAL ROUTE SOLUTION

BACKGROUND

In order to provide effective and efficient management of healthcare environments, healthcare institutions are using a variety of healthcare management systems. Such healthcare management systems may monitor the locations of patients, clinicians, and other users (e.g., non-clinicians, family members, friends, and the like), as well as equipment and other items. It would be desirable to use this location information to navigate a user to various locations within a healthcare environment. For instance, family members may be routed to a cafeteria and then back to a patient's room, clinicians may be routed to sites of a patient coding event, or the like. In addition to routing a user to a destination, it would be desirable to identify an optimal route for a specific user.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to identifying an optimal route to a destination for a user. A location of the user and a location of a destination are identified and utilized to identify a primary route. Route factors are utilized to identify an optimal route for the user. The optimal route is identified when the route factors do not conflict with the identified route.

Accordingly, in one aspect, the present invention is directed to one or more computer storage media storing computer-useable instructions that, when used by one or more computing devices, cause the one or more computing devices to perform a method. The method includes receiving a user location, an indication of a destination, and one or more route factors. Based on the one or more route factors, an optimal route is identified and displayed to the user.

In another aspect, the present invention is directed to one or more computer storage media storing computer-useable instructions that, when used by one or more computing devices, cause the one or more computing devices to perform a method. The method includes receiving an indication of a destination, a location of the user, and a plurality of route factors. The plurality of route factors includes one or more restricted areas, one or more obstacles, and one or more physical limitations of the user. Based on the plurality of route factors, an optimal route is identified and displayed to the user.

In yet another aspect, the present invention is directed to one or more computer storage media storing computer-useable instructions that, when used by one or more computing devices, cause the one or more computing devices to perform a method. The method includes receiving an indication of a destination and a first location of the user. Based on the destination and the first location of the user, a primary route is identified. A plurality of route factors is received including one or more restricted areas, one or more obstacles, and one or more physical limitations of the user. A determination is made whether at least one of the plurality of route factors conflicts with the primary route. Upon determining that none of the plurality of route factors conflict with the primary route, the primary route is identified as the optimal route and displayed to the user. Upon determining that at least one of the plurality of route factors conflicts with the primary route, the primary route is filtered out such that it is no longer an option for the user. An alternate route is identified and a determination is made whether at least one of the plurality of route factors conflicts with the alternate route. Upon determining that at least one of the plurality of route factors conflicts with the alternate route, an additional alternate route is identified. Upon determining that none of the plurality of route factors conflict with the alternate route, the alternate route is identified as the optimal route for the user and displayed to the user.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of the present invention provide for systems, methods, and computer storage media for identifying an optimal route to a destination for a user. A location of the user and a location of a destination are identified and utilized to identify a primary route. Route factors are utilized to identify an optimal route for the user. The optimal route is identified when the route factors do not conflict with the identified route.

Having briefly described embodiments of the present invention, an exemplary operating environment suitable for use in implementing embodiments of the present invention is described below. Referring to the drawings in general, and initially to FIG. 1 in particular, an exemplary computing system environment, for instance, a medical information computing system, on which embodiments of the present invention may be implemented is illustrated and designated generally as reference numeral 100. It will be understood and appreciated by those of ordinary skill in the art that the illustrated medical information computing system environment 100 is merely an example of one suitable computing environment and is not intended to suggest any limitation as to the scope of use or functionality of the invention. Neither should the medical information computing system environment 100 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

Figure 1:
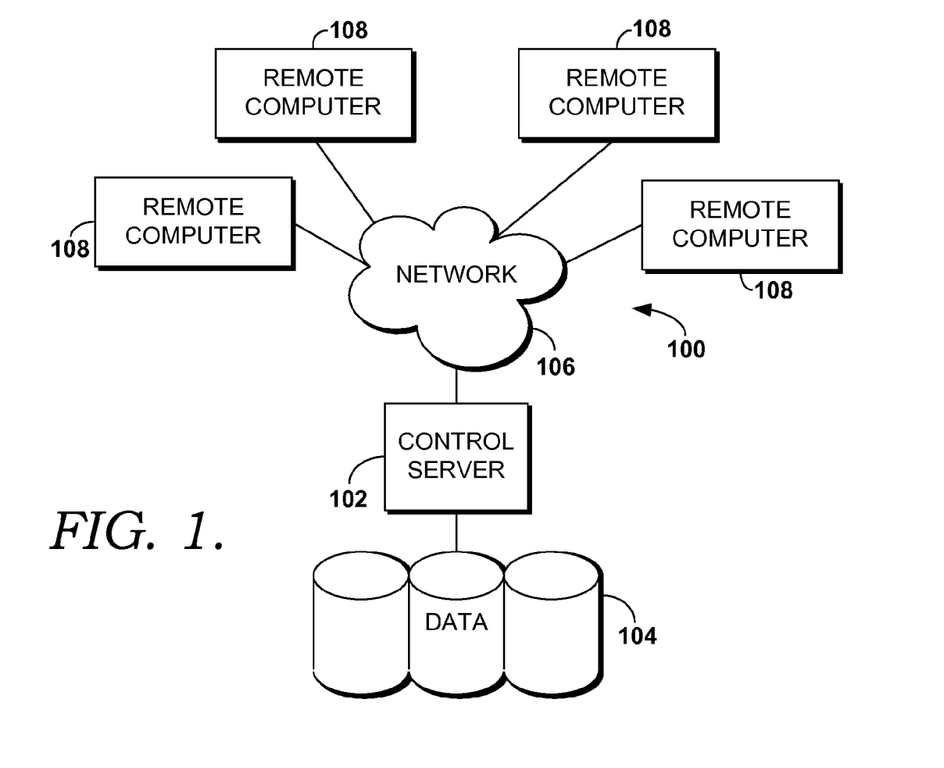
FIG. 1 is a block diagram of an exemplary computing environment suitable for use in implementing the present invention.

With continued reference to FIG. 1, the exemplary medical information computing system environment 100 includes a general purpose computing device in the form of a server 102. Components of the server 102 may include, without limitation, a processing unit, internal system memory, and a suitable system bus for coupling various system components, including database cluster 104, with the server 102. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 102 typically includes, or has access to, a variety of computer-readable media, for instance, database cluster 104. Computer-readable media can be any available media that may be accessed by server 102, and includes volatile and nonvolatile media, as well as removable and non-removable media. By way of example, and not limitation, computer-readable media may include computer storage media and communication media. Computer storage media may include, without limitation, volatile and nonvolatile media, as well as removable and nonremovable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 102. Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1, including database cluster 104, provide storage of computer-readable instructions, data structures, program modules, and other data for the server 102.

The server 102 may operate in a computer network 106 using logical connections to one or more remote computers 108. Remote computers 108 may be located at a variety of locations in a medical or research environment, for example, but not limited to, clinical laboratories, hospitals and other inpatient settings, veterinary environments, ambulatory settings, medical billing and financial offices, hospital administration settings, home healthcare environments, and clinicians' offices. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, genetic counselors, researchers, veterinarians, students, and the like. The remote computers 108 may also be physically located in nontraditional medical care environments so that the entire healthcare community may be capable of integration on the network. The remote computers 108 may be personal computers, servers, routers, network PCs, peer devices, other common network nodes, or the like, and may include some or all of the components described above in relation to the server 102. The devices can be personal digital assistants or other like devices.

Exemplary computer networks 106 may include, without limitation, local area networks (LANs) and/or wide area networks (WANs). Such networking environments are commonplace in offices, enterprise-wide computer networks, intranets, and the Internet. When utilized in a WAN networking environment, the server 102 may include a modem or other means for establishing communications over the WAN, such as the Internet. In a networked environment, program modules or portions thereof may be stored in the server 102, in the database cluster 104, or on any of the remote computers 108. For example, and not by way of limitation, various application programs may reside on the memory associated with any one or more of the remote computers 108. It will be appreciated by those of ordinary skill in the art that the network connections shown are exemplary and other means of establishing a communications link between the computers (e.g., server 102 and remote computers 108) may be utilized.

In operation, a user may enter commands and information into the server 102 or convey the commands and information to the server 102 via one or more of the remote computers 108 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 102. In addition to a monitor, the server 102 and/or remote computers 108 may include other peripheral output devices, such as speakers and a printer.

Although many other internal components of the server 102 and the remote computers 108 are not shown, those of ordinary skill in the art will appreciate that such components and their interconnection are well known. Accordingly, additional details concerning the internal construction of the server 102 and the remote computers 108 are not further disclosed herein.

Figure 2:
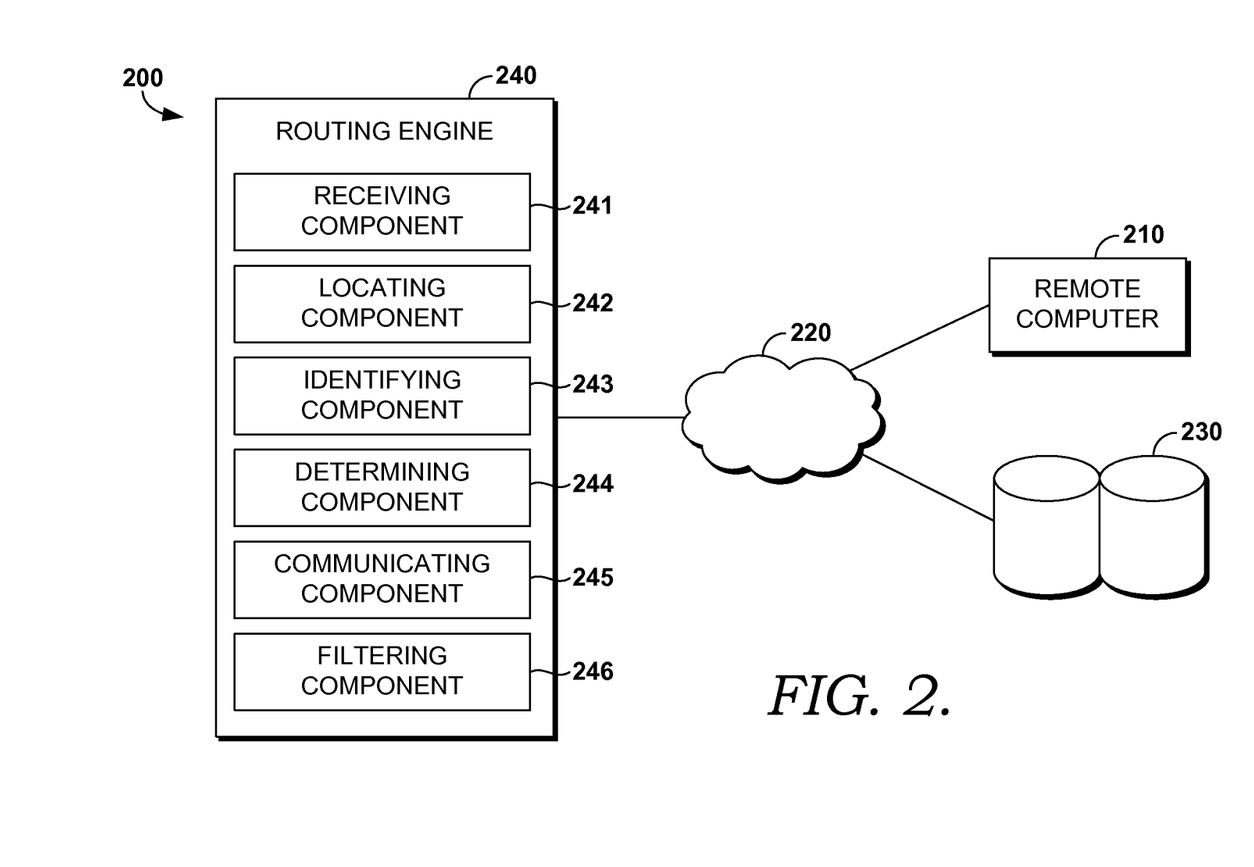
FIG. 2 is an exemplary system architecture suitable to implement embodiments of the present invention.

Turning to FIG. 2, an architectural framework 200 is shown for identifying an optimal route to a destination. This architectural framework 200 may operate, for instance, within the context of the exemplary medical information system 100 of FIG. 1. The system of FIG. 2 includes a remote computer 210, a network 220, a database 230, and a routing engine 240. Other components not shown here may also be used to carry out aspects of the present invention. Further, several components shown in FIG. 2 may be combined into a single component although shown separately in FIG. 2. Alternatively, components, such as the database 230, although shown as a single component, may actually be two or more components.

The routing engine 240 includes a receiving component 241, a locating component 242, an identifying component 243, a determining component 244, a communicating component 245, and a filtering component 246. Each component of the routing engine 240 may assist in receiving, identifying, storing, communicating, or the like, optimal routes to destinations. The routing engine 240 may be associated with a healthcare entity. Healthcare entities may include, but are not limited to, clinicians, hospitals, clinics, pharmacies, laboratories, and the like. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, genetic counselors, researchers, veterinarians, students, and the like.

Healthcare environments are sometimes not the easiest of environments to navigate. Additionally, even a user familiar with a healthcare environment, e.g., a clinician, may be unable to identify an optimal route on any given day. For instance, a corridor may be blocked for maintenance and obstructing a route normally taken by a clinician. Additionally, a clinician may receive an order but not be aware of a optimal route to a piece of equipment required to complete the order.

Non-clinicians especially struggle to locate destinations within a healthcare environment and are even less likely to identify the most efficient route or optimal route to get to the destination. An optimal route, as used herein, refers generally to a route from a first location to a second location that is customized for the user. The optimal route may be customized based on, for example, routing factors specific to a user and/or to a healthcare environment at a particular point in time. Routing factors, as used herein, may include physical limitations of a user, obstacles of a route, restricted areas of a route, user preferences, and the like, as described in detail below.

Returning to FIG. 2, a request to be navigated to an identified location is received by the receiving component 241 of the routing engine 240. The receiving component 241 is configured to receive requests input into the remote computer 210 by a user. The user may be a clinician or a non-clinician and the request may be a request to be routed to a specified destination. In embodiments, the request received at the receiving component 241 includes, at least, a user identifier associated with the user that has input the request.

Upon receiving the request including the user identifier, the locating component 242 identifies a location of the user and communicates the location to the receiving component 241. The locating component 242 is configured to identify a location associated with a user identifier. Identifiers may take the form of a security badge, an item attached to a security badge, or any other identifier having capabilities to be tracked. The identifiers may be tracked by way of sensors located in the healthcare environment. The sensors may utilize any real-time location services technology such as ultrasound technology, infrared technology, radio-frequency identification (RFID) technology, or the like. Using said technology, the sensors send out signals to identifiers.

The signals are received by the identifiers and the identifiers respond to the signals. A response from an identifier is received by the sensors and the sensors are able to recognize and determine the location of the responding identifier. When an identifier associated with a user is identified by a sensor, the location of the user is updated.

The locating component 242 is also configured to identify a location of an indicated destination. A location of a destination may be identified from a blueprint of the healthcare facility that may be stored within the database 230. The blueprint may include a plurality of navigation points. A navigation point, as used herein, refers generally to a point of reference for a geographical location within the blueprint. In embodiments, navigation points are located within a blueprint wherever a decision is required along the route. For instance, if a user has an option to turn right or turn left, use stairs or an elevator, or the like, a navigation point may be placed at that geographical point within the blueprint. A navigation point may be located at any point within a blueprint. An exemplary blueprint interface 300 is provided in FIG. 3.

Figure 3:
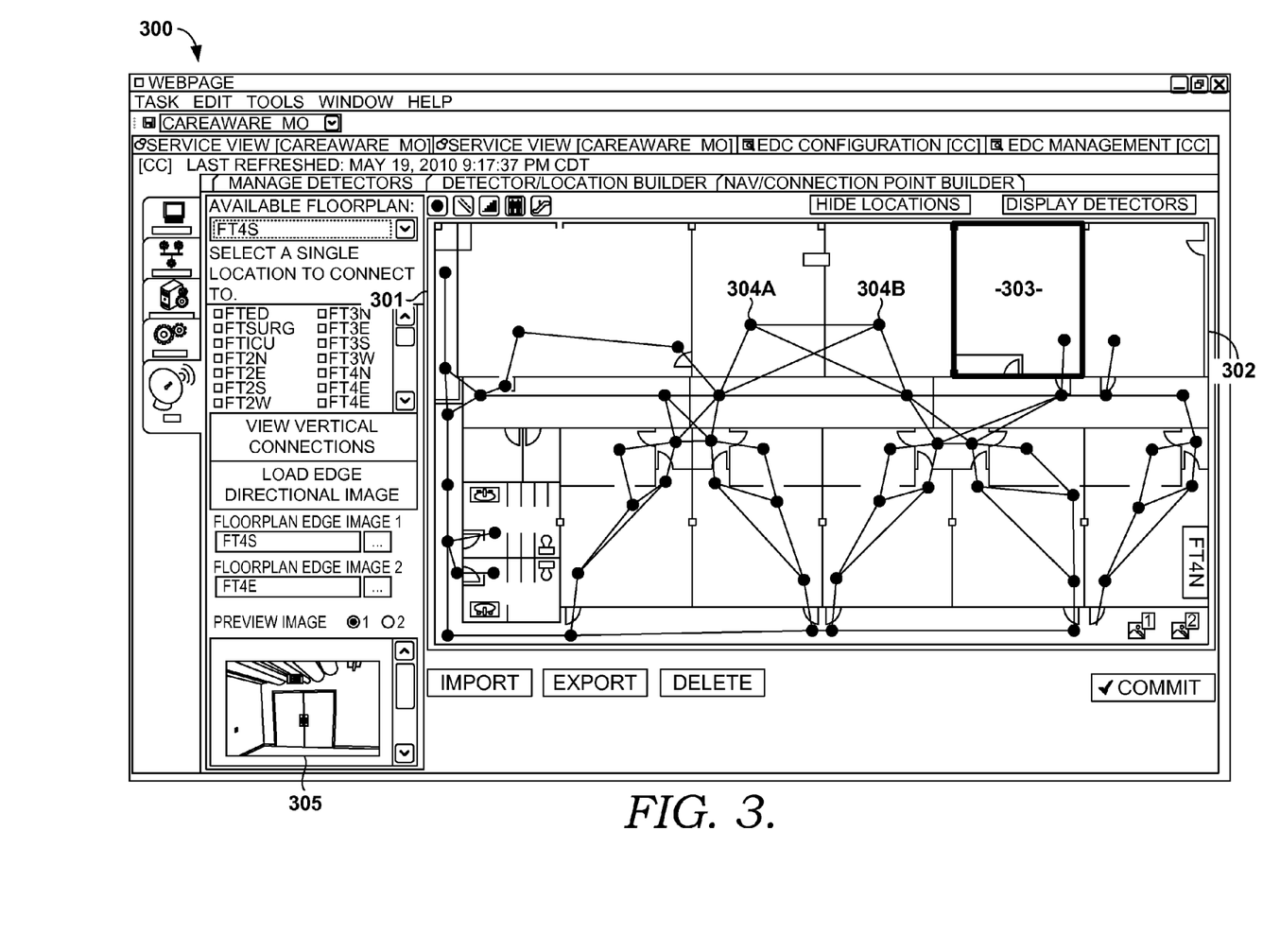
FIG. 3 is a screenshot illustrating an exemplary blueprint interface, in accordance with embodiments of the present invention.

The blueprint, in embodiments, is a geographical to-scale representation of a healthcare environment. Initially, a first edge 301 and a second edge 302, parallel to the first edge, are selected and a distance between the first edge and second edge is entered. This may represent, for example, a floor of a hospital, or the like. Accordingly, when a room 303, or any area within the first edge 301 and the second edge 302, is added to the blueprint, a distance of the room is entered and is depicted to-scale in the blueprint. As the blueprint is to-scale, an accurate determination of a time between two locations is easily identified. Thus, not only may a user be navigated to a destination, but the user may also receive an indication of the time required to arrive at the destination utilizing one or more navigation points 304A and 304B.

Also provided in the blueprint interface 300 is a navigation point image window 305. The navigation point image window 305 indicates an image that is associated with a specific navigation point. For instance, a user may select any navigation point within a blueprint and the associated image will be displayed in the navigation point image window 305. The associated images may be displayed to the user along with directions, as will discussed in detail below.

Returning to FIG. 2, once the locating component 242 has identified the location of the user and the location of the destination, the identifying component 243 may identify a primary route to the destination. The primary route may be a shortest-distance route between the user location and the destination. Alternatively, the primary route may be a shortest-time route between the user location and the destination. The identifying component 243 may also be configured to identify an optimal route for the user. The optimal route may or may not be the same as the primary route.

As previously described, an optimal route is a route from the user location to a destination that is customized for the user. The optimal route may be customized based on, for example, routing factors specific to a user and/or to a healthcare environment at a particular point in time. Routing factors may include physical limitations of a user, obstacles of a route, restricted areas of a route, user preferences, and the like. The routing factors may be identified by the identifying component 243.

A physical limitation, as used herein, refers generally to both permanent and temporary physical limitations. For instance, a user may be in a wheelchair, thus, precluding stairs as an optimal option for the user. Additionally, a user may have recently undergone a hip replacement surgery, requiring an elevator rather than stairs. Said clinical information may be received directly from the user's electronic health record.

Obstacles, as used herein, refer generally to any hindrance along a route. Obstacles may include, for example, maintenance areas, high traffic volume areas, closed areas, or the like. Thus, a user may still be able to navigate through a route (e.g., high traffic route) but it may not be ideal. By way of example only, assume that a user is on their way to a patient's room. The primary path includes an elevator that is currently closed for maintenance and will be closed for the remainder of the day. Thus, this is not the optimal route for the user.

Restricted areas, as used herein, refer generally to any area of the blueprint that requires credentials higher than that possessed by the user to access the area. For instance, assume that a clinician is on their way to a supply area to pick up a piece of equipment. A location exists along the shortest-distance route that they do not have proper credentials to access. Thus, this route would not be an optimal route for the user as they will not be able to access the restricted area.

User preferences identify preferences of a user that should be considered when identifying an optimal route for a user. For instance, a user may indicate to avoid stairs, escalators, elevators, high traffic areas, and the like. A user may indicate any number of preferences when determining an optimal route.

Returning to FIG. 2, upon identifying the route factors, the determining component 244 determines whether the primary path identified is the optimal route for the user. Determining whether the primary path is the optimal route for the user is based on the route factors. If one or more route factors conflict with the primary path, then the primary path is not the optimal path for the user. If the route factors do not conflict with the primary path, then the primary path may be the optimal path for the user.

The route factors may be analyzed by the determining component 244 in any order designated by an administrator or by a user in the user preferences, for instance. In an embodiment, the determining component 244 initially determines whether any restricted areas conflict with the primary path (i.e., whether restricted areas are included within the primary path) and then goes on to consider the physical limitations, obstacles, and user preferences. In an alternate embodiment, the determining component 244 determines whether any restricted areas conflict with the primary path, whether the user has any physical limitations that conflict with the primary path, and then considers any obstacles and user preferences that may conflict with the primary path.

If no route factors conflict with the primary path, the determining component 244 may determine that the primary path is the optimal route for the user. Upon determining the primary path is the optimal route for the user, the communicating component 245 is configured to communicate the optimal route to the user at the remote computer 210.

If one or more route factors conflict with the primary path, the determining component 244 may determine that the primary path is not the optimal route for the user. Upon a determination that the primary path is not the optimal route for the user, the filtering component 246 is configured to filter out the primary path while the identifying component 243 identifies an alternate route. The routing engine 240 may continue to identify alternate routes until a route that does not conflict with any routing factors is identified.

Upon identifying an optimal route, the communicating component 245 communicates the optimal route to the user at the remote computer 210. The remote computer may be any computing device known in the art having capabilities to receive a message including an optimal route. In embodiments, the remote computer 210 is a mobile phone.

Figure 4:
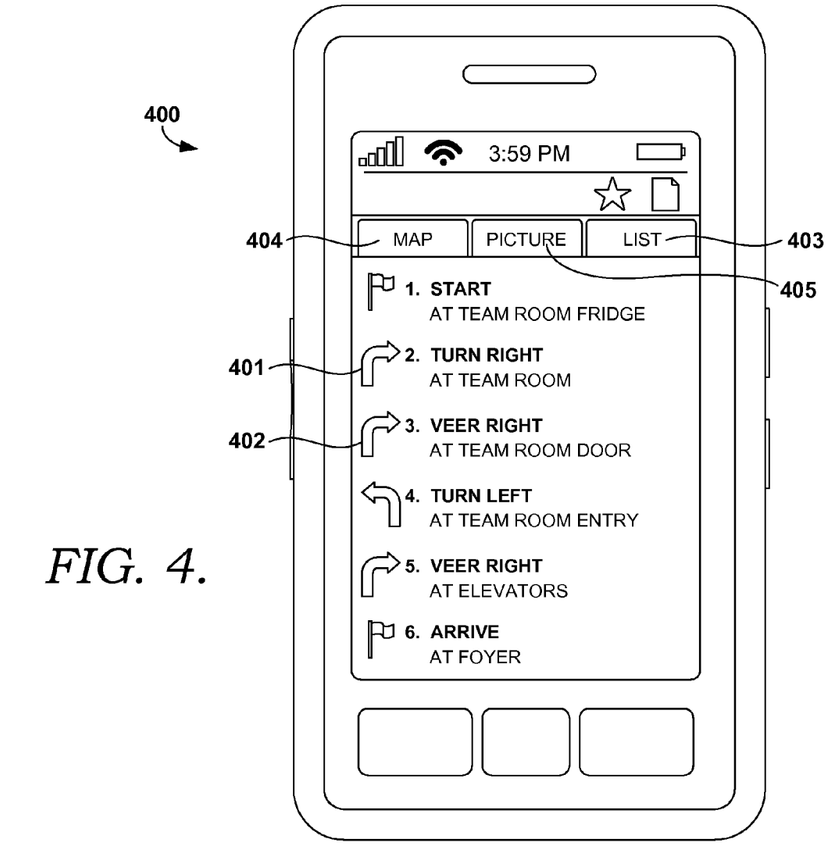
FIG. 4 is a screenshot illustrating an exemplary turn-by-turn interface, in accordance with an embodiment of the present invention.
Figure 5:
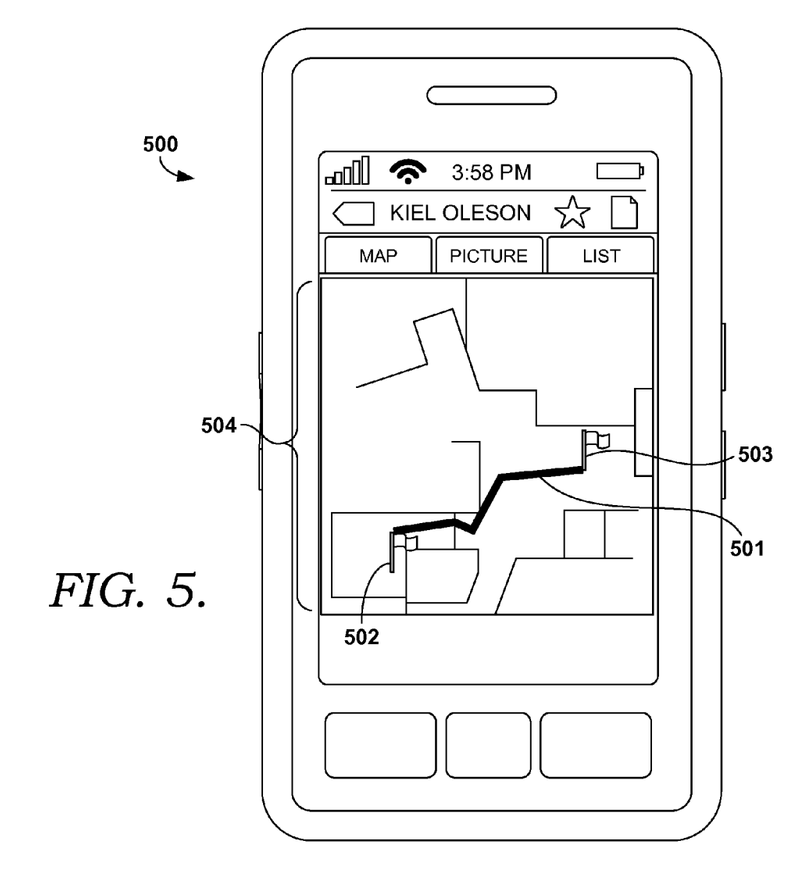
FIG. 5 is a screenshot illustrating an exemplary map interface, in accordance with an embodiment of the present invention.

The optimal route may be displayed to a user using the blueprint of the healthcare environment, a list of turn-by-turn directions, or a combination thereof. An exemplary turn-by-turn interface 400 is provided in FIG. 4. The turn-by-turn interface 400 includes one or more directional steps 401 and 402. Also, a list indicator 403 has been selected by the user. The turn-by-turn interface 400 also includes a map indicator 404 and a picture indicator 405. Upon selection of the map indicator 404, a user may be directed to a map interface 500 as provided in FIG. 5. The map interface 500 includes an indication of a route 501 from a starting location 502 to an ending location 503 within a map 504 of a healthcare environment.

Figure 6:
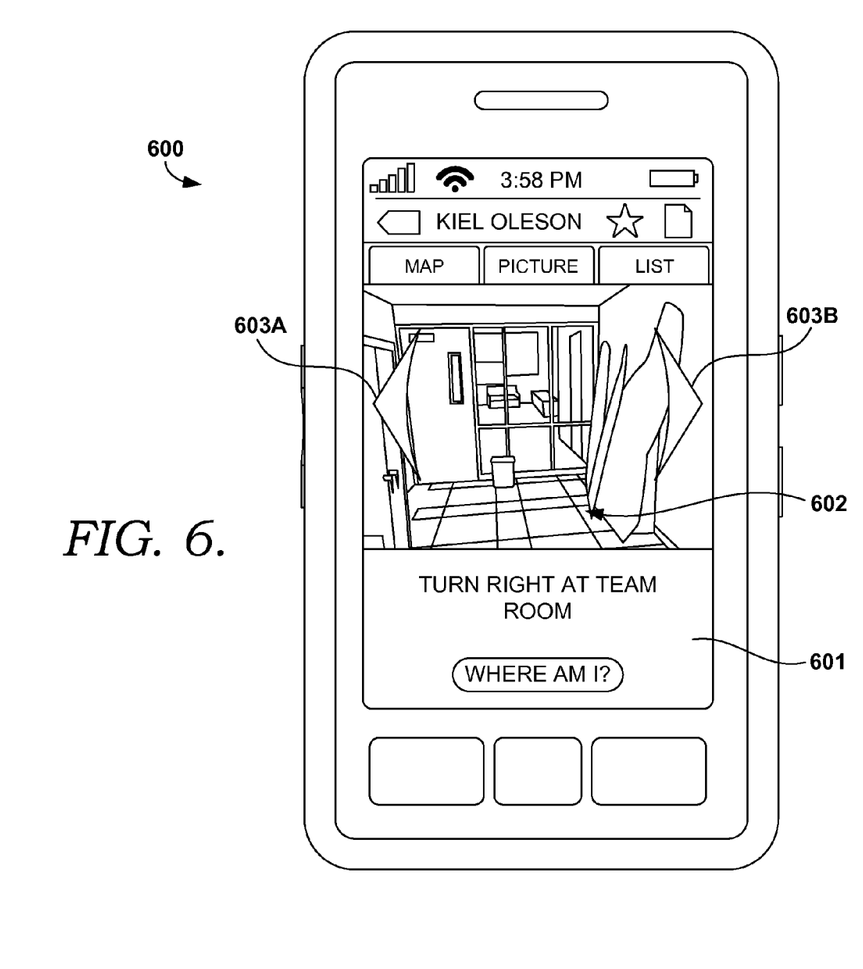
FIG. 6 is a screenshot illustrating an exemplary picture interface, in accordance with an embodiment of the present invention.

Upon selection of the picture indicator 405, a user may be directed to a picture interface 600 as provided in FIG. 6. The picture interface 600 includes both a turn-by-turn direction area 601 and an image area 602. The turn-by-turn direction area 601 is configured to display an upcoming direction. The directions may be updated as the user proceeds through the healthcare environment and the user identifier is tracked via the plurality of sensors. Similarly, the image area 602 is configured to display an image that is associated with the current upcoming direction. As the user navigates through the healthcare environment, updated location information is received for the user and both the turn-by-turn direction area 601 and the image area 602 may be automatically updated. Alternatively, a user could manually view a previous or an upcoming direction by selecting either a previous indicator 603A or an upcoming indicator 603B.

Returning to FIG. 2, as the updated location information for the user is received by the receiving component 241, an estimated arrival time may be adjusted depending on the rate with which the user is moving through the healthcare environment. Additionally, the optimal route may be modified as the user navigates through the healthcare environment. For example, if a user makes a wrong turn, the optimal path may be adjusted based on an updated location of the user. By way of further example, an elevator may be deemed out-of-service at any time so the optimal path may be adjusted should it include an elevator that has been recently removed from service.

The communicating component 245 may also be configured to communicate an estimated arrival time to a remote computer associated with the destination (not shown). For example, if a patient is being transported to radiology, a message may be communicated to a radiology workstation, or to a mobile device of radiology personnel, including the estimated arrival time of the patient. As the arrival time is updated, updated messages may be communicated to the remote computer associated with the destination.

Figure 7:
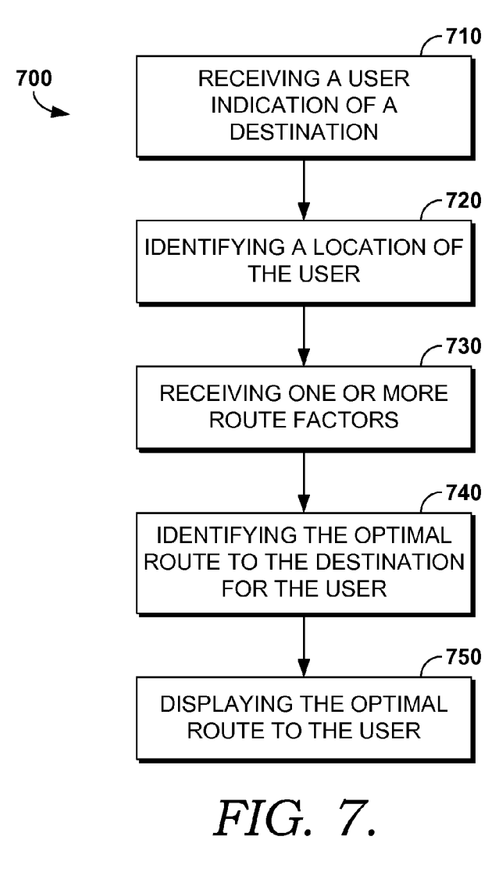
FIG. 7 is a flow diagram illustrating a first exemplary method for identifying an optimal route, in accordance with an embodiment of the present invention.

Turning now to FIG. 7, a flow diagram showing a method 700 for identifying an optimal route, in accordance with an embodiment of the present invention, is provided. Initially, at block 710 a user indication of a destination is received. In embodiments, the destination is one of a patient location, a location of equipment, or the like. At block 720, a location of the user is identified. At block 730 one or more route factors is received. The route factors include criteria for determining an optimal route for the user. In embodiments, the route factors include physical limitations of the user, restricted areas, obstacles, and user preferences. At block 740 the optimal route for the user is identified and displayed to the user at block 750.

Figure 8:
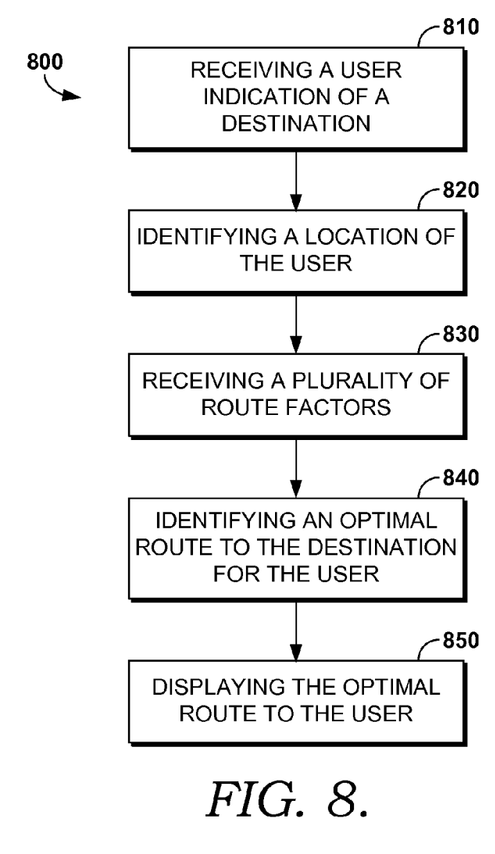
FIG. 8 is a flow diagram illustrating a second exemplary method for identifying an optimal route, in accordance with an embodiment of the present invention.

Referring to FIG. 8, a flow diagram showing a method 800 for identifying an optimal route, in accordance with an embodiment of the present invention, is provided. Initially, at block 810, a user indication of a destination is received and at block 820 a location of the user is identified. At block 830, a plurality of route factors is received. Based on the plurality of route factors, an optimal route for the user is identified at block 840 and displayed to the user at block 850.

Figure 9:
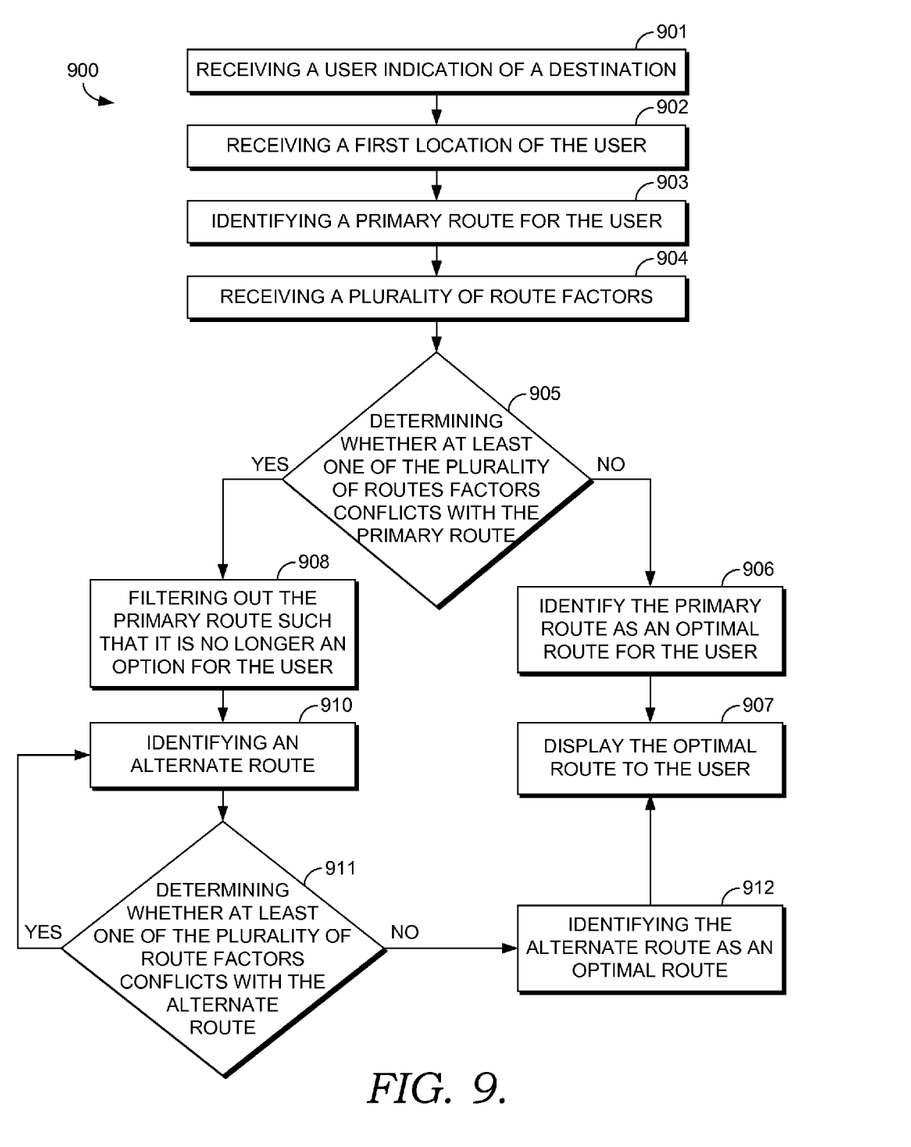
FIG. 9 is a flow diagram illustrating a third exemplary method for identifying an optimal route, in accordance with an embodiment of the present invention.

Referring to FIG. 9, a flow diagram showing a method 900 for identifying an optimal route, in accordance with an embodiment of the present invention, is provided. Initially, at block 901, a user indication of a destination is received. At block 902 a first location of the user is received. A primary route is identified for the user at block 903. The primary route may be the route that is the shortest distance to the destination. A plurality of route factors is received at block 904. The plurality of route factors may include one or more restricted areas, one or more physical limitations of the user, and one or more obstacles. At block 905 a determination is made whether at least one of the plurality of route factors conflicts with the primary route. Based upon a determination that none of the plurality of route factors conflict with the primary route, the primary route is identified as the optimal route for the user at block 906 and displayed to the user at block 907.

Based on a determination that at least one of the plurality of route factors conflicts with the primary route, the primary route is filtered out at block 908 such that it is no longer an option for the user. An alternate route is identified at block 910 and a determination is made, at block 911, whether at least one of the plurality of route factors conflicts with the alternate route. Based upon a determination that at least one of the plurality of route factors conflicts with the alternate route, the method returns to block 910 to identify another alternate route. Alternate routes may be identified until no route factors conflict with the identified route.

Based on a determination that none of the plurality of route factors conflicts with the alternate route, the alternate route is identified as the optimal route for the user at block 912. The optimal route is then displayed to the user at block 907.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. A computer-implemented method comprising:
    receiving an indication of a destination to which a user is to be navigated;
    determining a location of the user;
    based on the indication of the destination and the location of the user, determining a primary route for the user, wherein the primary route comprises 1) a route corresponding to a shortest travel time between the user and the destination or 2) a route corresponding to a shortest distance between the user and the destination;
    receiving one or more route factors, wherein the one or more route factors include criteria for determining an optimal route for the user, and wherein receiving the one or more route factors comprises receiving directly from an electronic health record (EHR) for the user an indication that the user has undergone a medical procedure that is associated with a physical limitation that is to be considered when determining the optimal route for the user;
    based on the one or more route factors, determining, at a processor of a computing device, the optimal route to the destination for the user, wherein determining the optimal route comprises:
        comparing each of the one or more route factors with the primary route,
        determining whether at least one of the one or more route factors conflicts with the primary route, wherein the determination comprises determining whether the physical limitation associated with the user conflicts with the primary route,
        based on a determination that the one or more route factors do not conflict with the primary route, determining the primary route is the optimal route, and
        based on a determination that at least one of the one or more route factors does conflict with the primary route, determining a first alternate route is the optimal route, wherein the one or more route factors do not conflict with the first alternate route; and
    communicating the optimal route to a mobile computing device associated with the user.

2. The method of claim 1, wherein the user is a clinician.

3. The method of claim 1, wherein the location of the user is identified with a plurality of sensors utilizing a real-time location services technology.

4. The method of claim 3, wherein the destination is a location of equipment, wherein the location of equipment is identified utilizing one or more equipment identifiers associated with the equipment and the plurality of sensors.

5. The method of claim 3, wherein the destination is a location of a patient, wherein the location of the patient is identified utilizing a patient identifier and the plurality of sensors.

6. The method of claim 1, wherein the one or more route factors include one or more of the following: one or more user preferences, one or more obstacles, or one or more restricted areas.

7. The method of claim 1, further comprising:
determining whether the optimal route includes one or more restricted areas; and
upon determining that the optimal route includes the one or more restricted areas, identifying a second alternate route to display to the user.

8. The method of claim 1, further comprising:
determining whether the optimal route includes one or more obstacles; and
upon determining that the optimal route includes the one or more obstacles, identifying a second alternate route to display to the user.

9. The method of claim 8, wherein the one or more obstacles include a closed area, a construction area, or a high traffic area.

10. The method of claim 1, wherein the optimal route is displayed to the user in one of a map, turn-by-turn directions, or a combination thereof.

11. The method of claim 1, wherein the physical limitation is received directly from the EHR for the user such that no user intervention is required to receive the physical limitation from the EHR.

12. A computing system comprising:
a processor; and
computer storage memory having computer-executable instructions stored thereon that, when executed by the processor, implement a method comprising:
receiving an indication of a destination to which a user is to be navigated,
determining a location of the user,
based on the indication of the destination and the location of the user, determining a primary route for the user, wherein the primary route comprises 1) a route corresponding to a shortest travel time between the user and the destination or 2) a route corresponding to a shortest distance between the user and the destination,
receiving a plurality of route factors, wherein the plurality of route factors includes one or more of the following: one or more user preferences, one or more restricted areas, one or more obstacles, or one or more physical limitations of the user,
based on the primary route and the plurality of route factors, determining a first optimal route to the destination for the user,
communicating the first optimal route to a first computing device that is associated with the user,
communicating to a second computing device that is located at the destination an estimated arrival time at which the user will arrive at the destination, wherein the estimated arrival time is based on the first optimal route,
determining a change associated with the first optimal route, wherein the change associated with the first optimal route comprises one or more of an updated location of the user or a change to one or more of the plurality of route factors,
based on determining the change associated with the first optimal route, determining a second optimal route to the destination for the user,
communicating the second optimal route to the first computing device that is associated with the user, and
communicating to the second computing device an updated estimated arrival time for the user, wherein the updated estimated arrival time is based on the second optimal route.

13. The system of claim 12, wherein the location of the user is identified with a plurality of sensors utilizing a real-time location services technology.

14. The system of claim 12, wherein one or more of the plurality of route factors are received directly from an electronic health record (EHR) for the user, such that no user intervention is required to receive the one or more of the plurality of route factors from the EHR.

15. The system of claim 12, wherein the one or more obstacles include a closed area, a construction area, or a high traffic area.

16. The system of claim 12, wherein the first optimal route and the second optimal route are displayed to the user in one of a map, turn-by-turn directions, or a combination thereof.

17. One or more non-transitory computer storage media storing computer-useable instructions that, when used by one or more computing devices, cause the one or more computing devices to perform a method comprising:
receiving an indication of a destination to which a user is to be navigated;
determining a first location of the user;
based on the first location of the user and the destination, determining a primary route for the user, wherein the primary route comprises 1) a route corresponding to a shortest travel time between the user and the destination or 2) a route corresponding to a shortest distance between the user and the destination;
receiving a plurality of route factors, wherein a route factor of the plurality of route factors is received from an electronic health record (EHR) for the user, and wherein the plurality of route factors includes one or more of the following: one or more user preferences, one or more restricted areas, one or more obstacles, or one or more physical limitations of the user;
determining whether at least one of the plurality of route factors conflicts with the primary route; and
based on a determination that at least one of the plurality of route factors conflicts with the primary route:
filtering out the primary route such that it is no longer an option for the user,
identifying an alternate route,
determining whether at least one of the plurality of route factors conflicts with the alternate route,
upon determining that none of the plurality of route factors conflicts with the alternate route, identifying the alternate route as an optimal route to the destination for the user,
communicating the optimal route to a computing device associated with the user, and
based on the optimal route, communicating to a second computing device that is located at the destination an estimated arrival time at which the user will arrive at the destination.

18. The media of claim 17, wherein the method further comprises:
receiving an indication of a second location for the user; and
based on the second location, updating the optimal route.

19. The media of claim 17, wherein the route factor that is received from the EHR for the user is received directly from the EHR such that no user intervention is required.

20. The media of claim 17, wherein the route factor that is received from the EHR for the user comprises a physical limitation associated with the user.

* * * * *